(12) United States Patent
Dahms et al.

(10) Patent No.: US 8,378,825 B2
(45) Date of Patent: Feb. 19, 2013

(54) SYSTEM AND METHOD FOR STOCKKEEPING IN AN AIRCRAFT GALLEY

(75) Inventors: Tobias Dahms, Adendorf (DE); Franz Angerer, Muehldorf (DE); Arne Anhalt, Hamburg (DE); Stephan Beier, Munich (DE); Martin Dobler, Haimhausen (DE); Ulf Glaser, Koblenz (DE); Juergen Hairbucher, Aying (DE); Fabian Knaul, Berlin (DE); Ralf Graefe, Haar (DE)

(73) Assignee: Airbus Operations GmbH, Hamburg (DE)

( * ) Notice: Subject to any disclaimer, the term of this patent is extended or adjusted under 35 U.S.C. 154(b) by 461 days.

(21) Appl. No.: 12/638,276

(22) Filed: Dec. 15, 2009

(65) Prior Publication Data

US 2011/0090064 A1     Apr. 21, 2011

(30) Foreign Application Priority Data

Oct. 21, 2009   (DE) .......................... 10 2009 050 239

(51) Int. Cl.
*G08B 13/14* (2006.01)

(52) U.S. Cl. ............... 340/572.1; 340/572.8; 340/539.1; 340/539.13; 235/385

(58) Field of Classification Search .... 340/572.1–572.9, 340/539.1, 539.13; 235/385
See application file for complete search history.

(56) References Cited

U.S. PATENT DOCUMENTS

| | | | | |
|---|---|---|---|---|
| 4,629,883 A | * | 12/1986 | Geiger ........................... | 250/221 |
| 6,325,586 B1 | * | 12/2001 | Loy ................................ | 414/281 |
| 7,504,949 B1 | * | 3/2009 | Rouaix et al. ............... | 340/572.1 |
| 2006/0214788 A1 | * | 9/2006 | Ku et al. .................... | 340/539.26 |
| 2008/0283596 A1 | * | 11/2008 | Ishida .......................... | 235/385 |
| 2009/0251286 A1 | * | 10/2009 | Black et al. .................. | 340/10.1 |
| 2009/0256680 A1 | * | 10/2009 | Kilian .......................... | 340/10.1 |
| 2010/0039262 A1 | * | 2/2010 | Cameron ................... | 340/568.1 |
| 2010/0102934 A1 | * | 4/2010 | Guichard ................... | 340/10.42 |

FOREIGN PATENT DOCUMENTS

| | | |
|---|---|---|
| DE | 102005049688 | 4/2007 |
| DE | 102008048500 | 4/2010 |
| EP | 0941923 | 1/1999 |
| WO | 9427117 | 11/1994 |
| WO | 2006062491 | 6/2006 |
| WO | 2007095000 | 8/2007 |

* cited by examiner

*Primary Examiner* — Jennifer Mehmood
*Assistant Examiner* — Ryan Sherwin
(74) *Attorney, Agent, or Firm* — Wood, Herron & Evans, LLP

(57) ABSTRACT

A system for stockkeeping in an aircraft galley includes a plurality of receiving devices which are provided for reception in a base body of the aircraft galley and are each provided with a transponder which is configured to emit an identification signal characteristic of the content of the corresponding receiving devices. Furthermore, the stockkeeping system includes at least one transmitting/receiving unit which is provided on the aircraft galley and is configured to read in identification signals emitted by the transponders of the receiving devices and transmit these signals to a data processing unit, the data processing unit being configured to determine, on the basis of the identification signals transmitted by the transmitting/receiving unit, the inventory of the aircraft galley. An output unit of the system is configured to output the inventory of the aircraft galley determined by the data processing unit.

9 Claims, 3 Drawing Sheets

SYSTEM AND METHOD FOR STOCKKEEPING IN AN AIRCRAFT GALLEY

CROSS-REFERENCE TO RELATED APPLICATIONS

This application claims priority to German Application No. DE 10 2009 050 239.4, filed Oct. 21, 2009.

TECHNICAL FIELD

The present invention relates to a system and a method for stockkeeping in an aircraft galley.

BACKGROUND

Galleys which are provided at present on board modern commercial aircraft customarily comprise parking places, at which can be parked mobile trolleys which are loaded with service products, such as, for example, food or drinks, required for providing to the passengers on board the aircraft. Furthermore, the galleys have storage compartments, in which boxes loaded with service products can be accommodated. To mark the contents of the trolleys and the storage compartments, the trolleys and the storage compartments are provided with adhesive labels which the catering company applies to outer surfaces of the trolleys and the storage compartments on loading the trolleys and the storage compartments. Furthermore, lists are drawn up, which show the cabin crew a list of the available service products and their storing position in the aircraft galley. Since these lists inform the cabin crew merely of the initial loading state of the aircraft galley, it is difficult for the cabin crew to keep track of the inventory of the galley during the flight. Furthermore, the adhesive labels applied to the outer surfaces of the trolleys and the storage compartments spoil the appearance of the trolleys and the galley.

An aircraft galley of modular design, comprising a base body with a plurality of compartments, is known from WO 2007/095000 A1. Various appliances, such as, for example, an oven or a microwave oven, are arranged in the compartments of the base body. Furthermore, a plurality of boxes arranged one behind the other, in which service products, such as, for example, food or drinks required for providing to the passengers on board the aircraft, can be accommodated, are received in the compartments of the base body.

DE 10 2005 049 688 A1 discloses an RFID (radio frequency identification) system for monitoring the transport and storage conditions of goods received in a trolley, which system comprises a transponder integrated in the trolley and having a measuring device for acquiring state data, such as, for example, the temperature, humidity, etc. inside the trolley. The data acquired by the measuring device are transmitted to reading stations of the RFID system which are provided, in the region of trolley parking places, in a store of a catering company charged with loading the trolleys, in a transport vehicle or in an aircraft galley.

The object underlying the invention is to provide a system and a method for stockkeeping in an aircraft galley which make it possible to keep better overview over the inventory of the galley.

SUMMARY OF THE INVENTION

This object is achieved by a system for stockkeeping in an aircraft galley having the features described below and a method for stockkeeping in an aircraft galley having the features described below.

A system, according to the invention, for stockkeeping in an aircraft galley comprises a plurality of receiving devices which are provided for reception in a base body of the aircraft galley. The receiving devices can, for example, be designed in the form of boxes, inserts or trolleys which can be accommodated in compartments provided in the base body of the aircraft galley. The receiving devices can be loaded, for example, with service products, such as, for example, food or drinks, required for providing to the passengers on board the aircraft, but also with other goods required on board the aircraft. Each of the receiving devices is provided with a transponder which is configured to emit an identification signal characteristic of the content of the receiving device to which the transponder is fitted. The transponder is preferably an RFID transponder, the signals of which can be read out both in the near distance range and in the far field.

Furthermore, the stockkeeping system according to the invention comprises at least one transmitting/receiving unit which is provided on the aircraft galley and is configured to read in identification signals emitted by the transponders of the receiving devices and transmit them to a data processing unit. The transmitting/receiving unit is preferably an RFID antenna. In order to reliably avoid disturbance of existing electronic systems on board the aircraft, the transmitting/receiving unit is preferably designed as a near-field antenna with a maximum power of 100 mW.

The data processing unit is configured to determine, on the basis of the identification signals transmitted to it by the transmitting/receiving unit, the inventory of the aircraft galley. The data processing unit can comprise, for example, an industrial computer which is configured to communicate with the transmitting/receiving unit and/or further components of the stockkeeping system. In particular, the industrial computer of the data processing unit can be configured to control the operation of the transmitting/receiving unit and/or the operation of further components of the stockkeeping system. The industrial computer is preferably connected to a personal computer, in the memory of which, for example, a data base for storing the inventory of the aircraft galley can be stored.

Finally, the system, according to the invention, for stockkeeping in an aircraft galley comprises an output unit which is configured to output the inventory of the aircraft galley determined by the data processing unit. The output unit can comprise, for example, a monitor connected to the personal computer of the data processing unit and/or a printer. The output unit can output the inventory of the aircraft galley in the form of lists or in the form of a graphical representation.

The system, according to the invention, for stockkeeping in an aircraft galley makes it possible to determine the inventory of the aircraft galley in real time, that is to say, with the aid of the stockkeeping system according to the invention, at all times the current inventory of the aircraft galley can be determined even during the flight. Inventory lists or corresponding graphical representations can be output in a manner convenient for the cabin crew via the output unit. Finally, the stockkeeping system according to the invention makes it possible to dispense with the application of visually rather unattractive adhesive labels to the receiving devices and the aircraft galley. The system, according to the invention, for stockkeeping in an aircraft galley is particularly well suited to use in an aircraft galley of modular design, such as that described in WO 2007/095000 A1. However, it can also be used in conventionally designed aircraft galleys.

Besides the lack of overview over the current inventory of the aircraft galley during the flight, a further problem of the manual stockkeeping system with the aid of adhesive labels and lists which is used at present is that it is very inconvenient and time-consuming for the cabin crew to ascertain the storing positions of the various service products in the aircraft galley using the adhesive labels and the lists. In a preferred embodiment, the system, according to the invention, for stockkeeping in an aircraft galley therefore comprises, for at least one transponder provided on a receiving device, a transmitting/receiving unit assigned to the transponder. Furthermore, the data processing unit is preferably configured to determine, on the basis of the identification signals transmitted to it by the transmitting/receiving unit assigned to the transponder, the position of the receiving device in the base body of the aircraft galley.

By way of example, the position of the transmitting/receiving unit in the base body of the aircraft galley can be stored in a memory of the data processing unit, which memory can be part of an industrial computer or a personal computer. When the transmitting/receiving unit receives from the transponder assigned to it an identification signal and forwards it to the data processing unit, the data processing unit can then determine that the receiving device with a content characterised by the identification signal emitted by the transponder is arranged in the position, stored for the transmitting/receiving unit, in the base body of the aircraft galley.

If desired, the system can comprise for each transponder provided on a receiving device a transmitting/receiving unit assigned to the transponder. The number of transmitting/receiving units then corresponds to the number of transponders. In the case of such an embodiment of the stockkeeping system, the aircraft galley is equipped with an array of transmitting/receiving units which makes it possible to determine the position of the receiving device in the base body of the aircraft galley for each receiving device provided with a transponder. Position determination with the aid of an array of transmitting/receiving units is very reliable, but requires a relatively large number of transmitting/receiving units.

Alternatively or additionally thereto, the stockkeeping system according to the invention can comprise a movement direction detection device for detecting a movement direction of a receiving device relative to the base body of the aircraft galley. Preferably, the movement direction detection device is configured to detect whether a receiving device is being introduced into the base body of the aircraft galley or withdrawn from the base body of the aircraft galley. By way of example, the movement direction detection device can detect the pushing-in of a receiving device into a compartment of the aircraft galley base body or the pulling-out of a receiving device from the compartment of the aircraft galley base body.

Furthermore, the data processing unit of the stockkeeping system is preferably configured to determine, on the basis of the identification signals transmitted to it by the transmitting/receiving unit and on the basis of the movement direction, determined by the movement direction detection device, of the receiving device relative to the base body of the aircraft galley, the position of the receiving device in the aircraft galley. By way of example, the position of the movement direction detection device on the base body of the aircraft galley can be stored in a memory of the data processing unit, which memory can be part of an industrial computer or a personal computer. The data processing unit can then, for example, determine that a receiving device with a content characterised by a corresponding identification signal is being introduced into the base body of the aircraft galley or withdrawn from the base body of the aircraft galley in a position determined by the arrangement of the movement direction detection device on the base body of the aircraft galley. A continuous determination of the positions of the receiving devices to be accommodated in the aircraft galley base body is possible when each compartment, to be loaded with a receiving device, of the aircraft galley base body is equipped with a corresponding movement direction detection device.

When the stockkeeping system according to the invention is provided, for each transponder provided on a receiving device, with a transmitting/receiving unit assigned to the transponder and additionally with a movement direction detection device or a desired number of movement direction detection devices, the position detection function is redundantly designed and the system is particularly reliable in this regard. If the number of transmitting/receiving units to be provided in the aircraft galley is to be reduced, it is, however, also possible not to provide, for each transponder provided on a receiving device, a transmitting/receiving unit assigned to the transponder, but merely to make available a desired number of movement direction detection devices for determining the positions of the receiving devices in the base body of the aircraft galley.

The movement direction detection device preferably comprises a light-barrier system. By way of example, there can be provided in the light-barrier system two light barriers which are arranged one behind the other in relation to the movement direction of the receiving device relative to the base body of the aircraft galley. On the basis of the order in which the two light barriers are broken on a movement of the receiving device relative to the base body of the aircraft galley, the movement direction detection device can then determine whether the receiving device is being withdrawn from the base body of the aircraft galley or inserted into the base body of the aircraft galley.

Furthermore, the data processing unit is preferably configured to employ a last-in-first-out logic to determine the position of the receiving device in the aircraft galley. The logic is preferably stored in a memory of the data processing unit and makes it possible to determine the positions of receiving devices in the base body of the aircraft galley, which are received, in relation to the movement direction of the receiving devices relative to the base body of the aircraft galley, one behind the other in the base body of the aircraft galley, for example in a compartment formed in the aircraft galley base body. The logic is based on the fact that a receiving device which was the last to be introduced into the base body of the aircraft galley, out of a plurality of receiving devices introduced into the base body of the aircraft galley one behind the other, must be the first of the receiving devices received in the aircraft galley base body one behind the other to be withdrawn from the aircraft galley base body again, before the withdrawal of the receiving devices received further back in the aircraft galley base body is possible. Consequently, the detection of the withdrawal of one receiving device of a plurality of receiving devices received in the base body of the aircraft galley one behind the other is interpreted as the withdrawal of that receiving device from the base body of the aircraft galley which was the last of the receiving devices, received in the base body of the aircraft galley one behind the other, to be introduced into the base body of the aircraft galley.

The output unit of the stockkeeping system according to the invention is preferably configured to output a position, determined by the data processing unit, of a receiving device in the base body of the aircraft galley in the form of a graphical representation. By way of example, the output unit can output on a monitor or a printer a graphical overview representation of the aircraft galley, indicating the position of the receiving device and its contents. Preferably, the positions of all the receiving devices accommodated in the aircraft galley and their contents are indicated in the graphical representation output by the output unit.

A method, according to the invention, for stockkeeping in an aircraft galley comprises emitting identification signals which are each characteristic of the content of receiving devices provided for reception in a base body of the aircraft galley. The identification signals are read in and transmitted to a data processing unit. The inventory of the aircraft galley is determined on the basis of the identification signals transmitted to the data processing unit. Finally, the inventory of the aircraft galley determined by the data processing unit is output.

The identification signals emitted by at least one transponder provided on a receiving device are preferably read in by a transmitting/receiving unit, provided on the aircraft galley and assigned to the transponder, and are transmitted to the data processing unit. The data processing unit can determine, on the basis of the identification signals transmitted to it by the transmitting/receiving unit assigned to the transponder, the position of the receiving device in the base body of the aircraft galley.

Alternatively or additionally thereto, a movement direction of a receiving device relative to the base body of the aircraft galley can be detected by means of a movement direction detection device. The data processing unit can then determine, on the basis of the identification signals transmitted to it and on the basis of the movement direction, determined by the movement direction detection device, of the receiving device relative to the base body of the aircraft galley, the position of the receiving device in the aircraft galley.

Preferably, the movement direction of the receiving device relative to the base body of the aircraft galley is determined by the movement direction detection device on the basis of the order in which two light barriers of a light-barrier system are broken, which barriers are arranged one behind the other in relation to the movement direction of the receiving device relative to the base body of the aircraft galley.

The data processing unit can employ a last-in-first-out logic to determine the position of the receiving device in the aircraft galley.

Preferably, a position, determined by the data processing unit, of a receiving device in the base body of the aircraft galley is output in the form of a graphical representation.

BRIEF DESCRIPTION OF THE DRAWINGS

A preferred embodiment of the invention is now explained in more detail with reference to appended, schematic drawings, of which.

DETAILED DESCRIPTION

Figure 1:
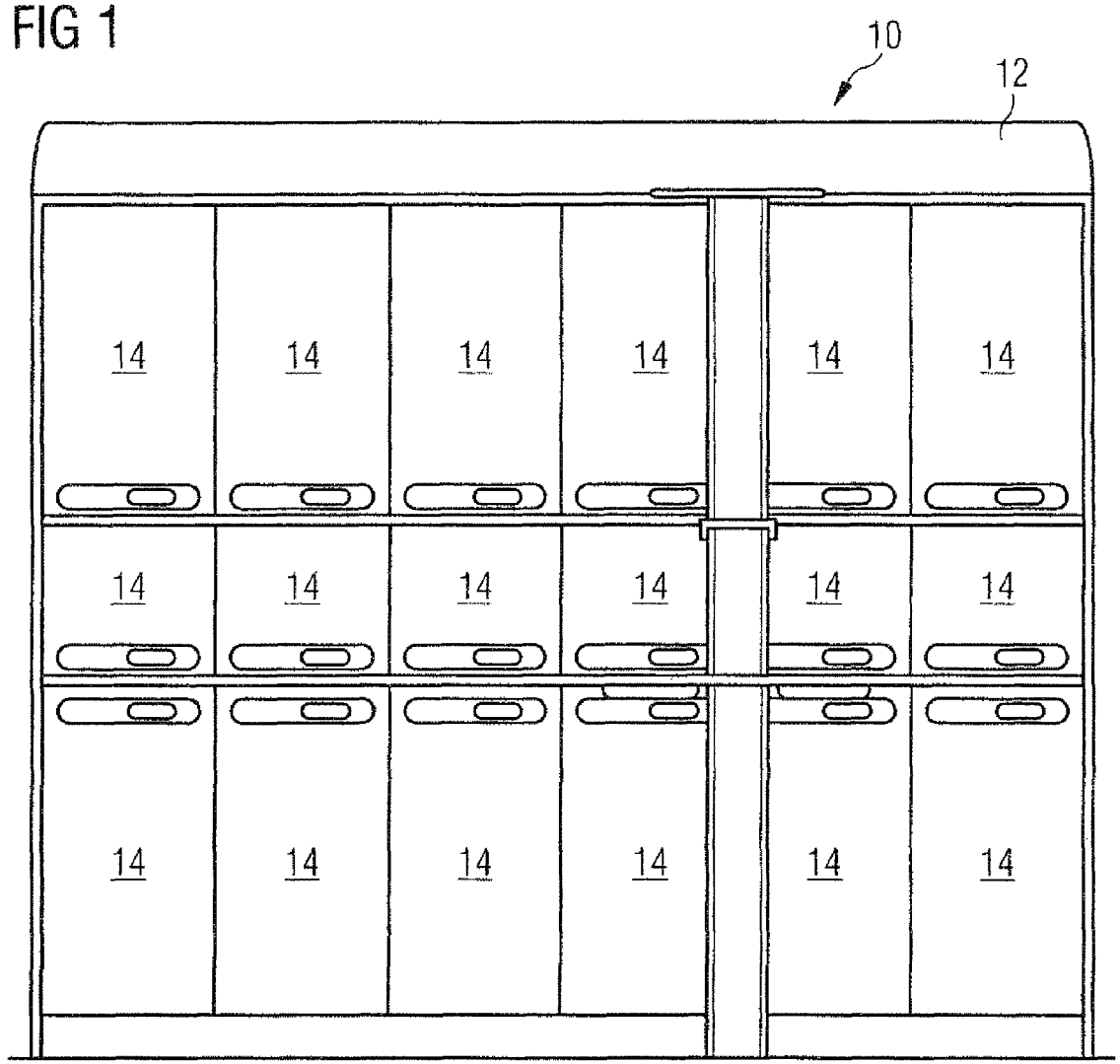
FIG. 1 shows a front view of a first embodiment of an aircraft galley.
Figure 2:
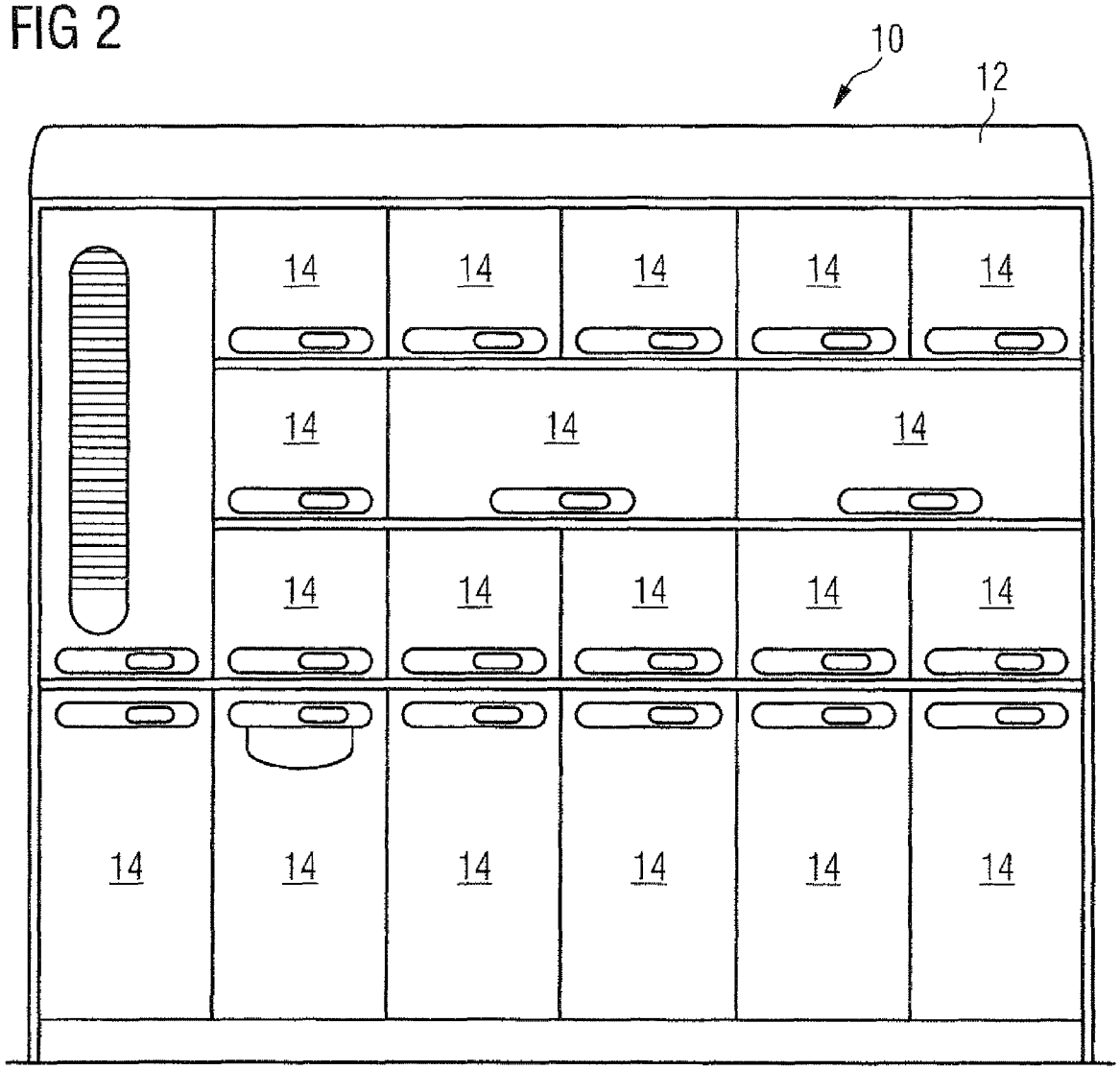
FIG. 2 shows a front view of a second embodiment of an aircraft galley.

An aircraft galley 10, illustrated in FIGS. 1 and 2, comprises a base body 12, in which a plurality of compartments 14 are formed. At least one receiving device 16 can be accommodated in each compartment 14. In the exemplary embodiment, shown in FIG. 3, of one compartment 14 formed in the aircraft galley base body 12, six receiving devices 16 are accommodated in the compartment 14 in two rows, arranged one above the other, of three receiving devices 16 each.

The receiving devices 16 can be designed in the form of inserts or boxes. Alternatively thereto, however, it is also conceivable to accommodate receiving devices 16 in the form of mobile trolleys in the aircraft galley 10. The receiving devices 16 can be loaded, for example, with service products, such as, for example, food or drinks, which are required for providing to the passengers on board the aircraft. However, other goods required during the flight on board the aircraft can also be accommodated in the receiving devices 16.

Figure 3:
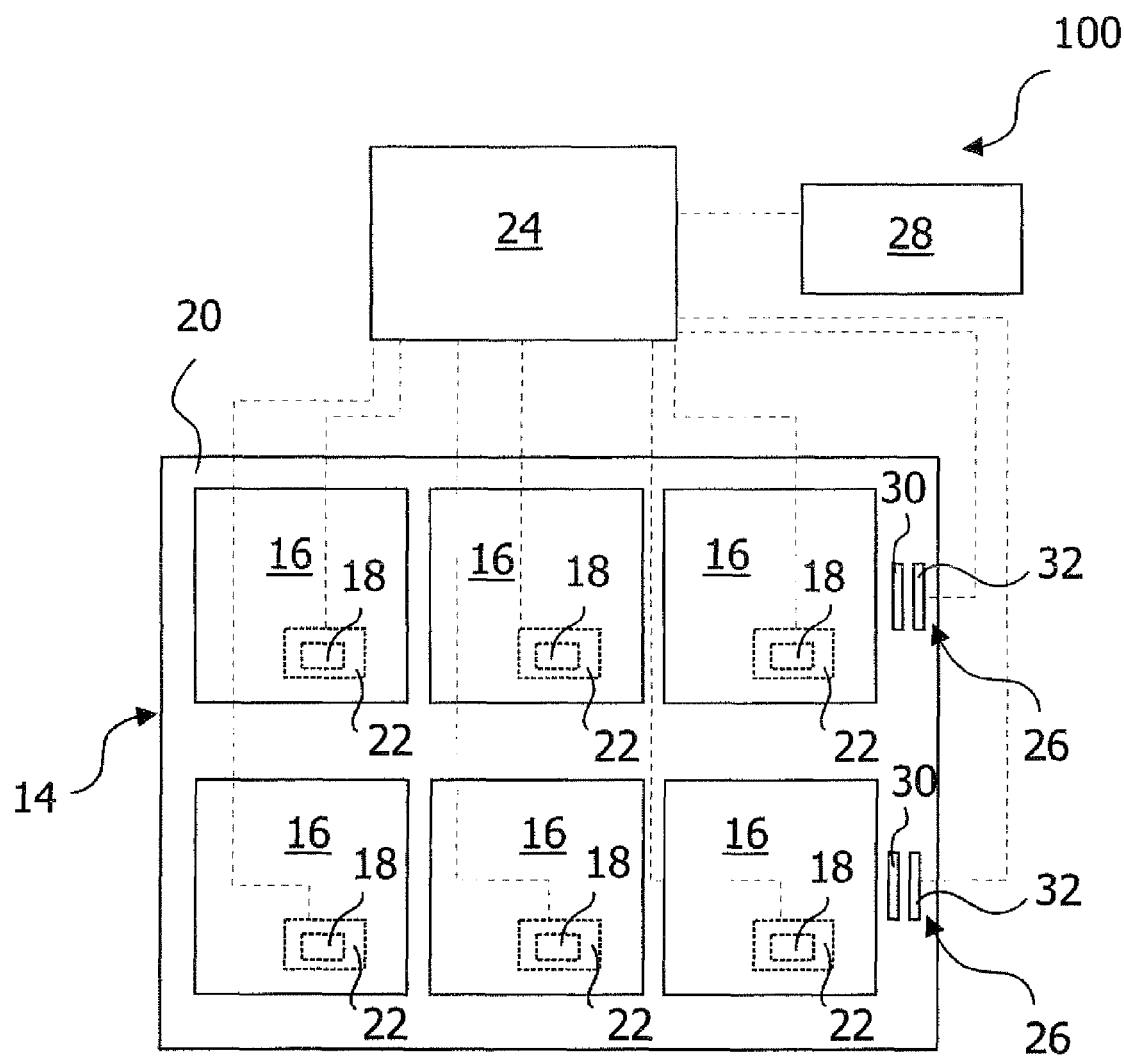
FIG. 3 shows a lateral, partially sectioned view of one compartment of an aircraft galley loaded with six receiving devices, and a schematic representation of a system for stockkeeping in an aircraft galley.

As can be seen in FIG. 3, each receiving device 16 is provided with a transponder 18, which is configured to emit an identification signal characteristic of the content of the corresponding receiving device 16. The transponders 18 fitted to the receiving devices 16 are formed as RFID transponders and transmit identification signals, which can be read out both in the near distance range and in the far field. In the exemplary embodiment illustrated in FIG. 3, the transponders 18 are each formed on side walls of the receiving devices 16 which are opposite a side wall 20 of the compartment 14 formed in the aircraft galley base body 12.

Six transmitting/receiving units 22 are arranged on the side wall 20 of the compartment 14. Each of the transmitting/receiving units 22 is designed in the form of an RFID antenna and is assigned to a transponder 18 fitted to a receiving device 16. In order to prevent disturbance of electronic systems present on board the aircraft by the transmitting/receiving units 22, the transmitting/receiving units 22 are formed as near-field antennas with a maximum power of 100 mW.

In the embodiment shown in FIG. 3, the transponders 18 are designed as passive transponders with a passive energy storage device. The transmitting/receiving units 22 accordingly each comprise a charging unit which makes it possible to charge the energy storage unit of the transponder 18 assigned to the transmitting/receiving unit 22, where necessary. Alternatively thereto, however, the transponders 18 can also be designed as active transponders with their own energy source.

The transmitting/receiving units 22 serve to read in the identification signals emitted by the transponders 18, each transmitting/receiving unit 22 reading in the signals of the transponder 18 assigned to it. The identification signals read in by the transmitting/receiving units 22 are transmitted by the transmitting/receiving units 22 to a data processing unit 24 of a system 100 for stockkeeping in an aircraft galley 10. The data processing unit 24 comprises an industrial computer which serves to communicate with the transmitting/receiving units 22 and with movement direction detection devices, which will be explained in more detail below, and to control the operation of these components. Furthermore, the data processing unit 24 comprises a personal computer.

On the basis of the identification signals transmitted to it by the transmitting/receiving units 22 and characteristic of the content of the receiving devices 16, the data processing unit 24 determines in real time the current inventory of the aircraft galley 10 at the time. The inventory of the aircraft galley 10 determined by the data processing unit 24 is output via an output unit 28 connected to the data processing unit 24. The output unit 28 can comprise a monitor and/or a printer and output the inventory of the aircraft galley 10 determined by the data processing unit 24 in the form of lists and/or a graphical representation. Furthermore, the inventory of the aircraft galley can be stored in a data base, which is stored in a memory of the personal computer of the data processing unit 24.

As already mentioned, in the exemplary embodiment of a stockkeeping system 100 shown in FIG. 3, a transmitting/receiving unit 22 is assigned to each transponder 18 fitted to a receiving device 16. Furthermore, information about the positions of the individual transmitting/receiving units 22 in the compartment 14 of the aircraft galley base body 12 is stored in a memory of the data processing unit 24, which memory can be part of the industrial computer or the personal computer. When an identification signal is transmitted to the data processing unit 24 by a particular transmitting/receiving unit 22, which signal is supplied to the transmitting/receiving unit 22 by an assigned transponder 18, the data processing unit 24 can thus determine the position of the receiving device 16, to which the transponder 18 is fitted, in the compartment 14 and thus in the base body 12 of the aircraft galley 10. The output unit 28 can consequently output a graphical representation of the aircraft galley base body 12, in which representation the positions of the individual receiving devices 16 and their contents are presented.

The movement direction detection devices 26 of the stockkeeping system 100 each comprise a light-barrier system having two light barriers 30, 32 which are fitted to the side wall 20 of the compartment 14. In relation to a movement direction of the receiving devices 16 relative to the compartment 14 and the base body 12 of the aircraft galley 10 on insertion into the compartment 14 or withdrawal from the compartment 14, the light barriers 30, 32 are fitted to the side wall 20 of the compartment 14 one behind the other. On the basis of the order in which the light barriers 30, 32 are broken on a movement of a receiving device 16 relative to the compartment 14 or the base body 12 of the aircraft galley 10, the movement direction of the receiving device 16 relative to the base body 12 of the aircraft galley 10 can thus be determined, that is to say it can be determined whether the receiving device 16 is being introduced into the compartment 14 or withdrawn from the compartment 14. For each of the two rows of receiving devices 16 arranged one above the other, a separate movement direction detection device 26 is provided in the arrangement shown in FIG. 3.

Information about the positions of the movement direction detection devices 26 on the base body of the aircraft galley is stored in the memory of the data processing unit 24, which memory can be part of the industrial computer or the personal computer. Furthermore, a last-in-first-out logic is implemented in the data processing unit 24. The last-in-first-out logic is based on the fact that a receiving device 16, inserted last into the compartment 14, of the receiving devices 16 received in the compartment 14 one behind the other must be the first receiving device 16 withdrawn from the compartment 14 again before the other receiving devices 16 can also be withdrawn from the compartment 14 again. Consequently, the detection of the withdrawal of one receiving device 16 of a plurality of receiving devices 16 received in the base body 12 of the aircraft galley one behind the other is interpreted as the withdrawal of that receiving device 16 from the base body 12 of the aircraft galley 10 which was the last of the receiving devices 16, received in the base body 12 of the aircraft galley 10 one behind the other, to be introduced into the base body 12 of the aircraft galley 10.

On the basis of the identification signals transmitted to it by the transmitting/receiving units 22 and on the basis of the movement direction, determined by one of the movement direction detection devices 26, of a receiving device 16 relative to the compartment 14 or the base body 12 of the aircraft galley 10, the data processing unit 24 can thus likewise determine the positions of the individual receiving devices 16 in the compartment 14 or the base body 12 of the aircraft galley 10.

In the embodiment shown in FIG. 3, the stockkeeping system 100 is thus equipped with two redundant systems for determining the positions of the receiving devices 16 in the base body 12 of the aircraft galley 10. If desired or necessary, however, it is also conceivable to provide the stockkeeping system 100 with only one transmitting/receiving unit 22 or with a number of transmitting/receiving units 22 which is less than the number of transponders 18. The determination of the positions of the receiving devices 16 in the base body 12 of the aircraft galley 10 then takes place with the aid of the movement direction detection devices 26.

Furthermore, in the exemplary embodiment illustrated in FIG. 3, the identification is signals emitted by the transponders 18 are used solely to determine the inventory of the aircraft galley 10 and the positions of the receiving devices 16, provided with the transponders 18, in the aircraft galley 10. The transponders 18 can, however, also be used to communicate with transmitting/receiving units which are provided in a store of a catering company and/or in a transport vehicle. This makes it possible, also during the storage and/or transportation of the receiving devices 16, to track the content and/or position of the receiving devices 16 in the store and/or the transport vehicle.

The invention claimed is:

1. A system for stockkeeping in an aircraft galley, the system comprising:
a plurality of receiving devices which are provided for reception in a base body of the aircraft galley and are each provided with a transponder which is configured to emit an identification signal characteristic of the content of the corresponding receiving device,
at least one transmitting/receiving unit which is provided on the aircraft galley and is configured to read in identification signals emitted by the transponders of the receiving devices and transmit them to a data processing unit, the data processing unit being configured to determine, on the basis of the identification signals transmitted by the transmitting/receiving unit, the inventory of the aircraft galley,
a movement direction detection device for detecting a movement direction of a receiving device relative to the base body of the aircraft galley, wherein the data processing unit is configured to determine, on the basis of the identification signals transmitted by the transmitting/receiving unit and on the basis of the movement direction, determined by the movement direction detection device, of the receiving device relative to the base body of the aircraft galley, the position of the receiving device in the base body of the aircraft galley, and wherein the data processing unit employs a last-in-first-out logic to determine the position of the receiving device in the base body of the aircraft galley, and
an output unit which is configured to output the inventory of the aircraft galley determined by the data processing unit.

2. The system according to claim 1, wherein the system comprises, for at least one transponder provided on a receiving device, a transmitting/receiving unit assigned to the transponder, and wherein the data processing unit is configured to determine, on the basis of the identification signals transmitted by the transmitting/receiving unit assigned to the transponder, the position of the receiving device, provided with the transponder, in the base body of the aircraft galley.

3. The system according to claim 1, wherein the movement direction detection device comprises a light-barrier system having two light barriers which are arranged one behind the other in relation to the movement direction of the receiving device relative to the base body of the aircraft galley.

4. The system according to claim 1, wherein the output unit is configured to output a position, determined by the data processing unit, of a receiving device in the base body of the aircraft galley in the form of a graphical representation.

5. A method for stockkeeping in an aircraft galley the method comprising comprises:
- detecting a movement direction of a receiving device relative to a base body of the aircraft galley,
- emitting identification signals which are each characteristic of the content of receiving devices provided for reception in the base body of the aircraft galley,
- reading in the identification signals and transmitting the identification signals to a data processing unit,
- determining the inventory of the aircraft galley on the basis of the identification signals transmitted to the data processing unit,
- determining the position of the receiving device in the base body of the aircraft galley on the basis of the identification signals transmitted to the data processing unit, and on the basis of the movement direction of the receiving device relative to the base body of the aircraft galley, wherein the data processing unit employ a last-in-first-out logic to determine the position of the receiving device in the base body of the aircraft galley,
- outputting the inventory of the aircraft galley determined by the data processing unit.

6. The method according to claim 5, wherein the identification signals emitted by at least one transponder provided on a receiving device are read in by a transmitting/receiving unit, provided on the aircraft galley and assigned to the transponder, and are transmitted to the data processing unit, and wherein the data processing unit determines, on the basis of the identification signals transmitted by the transmit/receive unit assigned to the transponder the position of the receiving device in the base body of the aircraft galley.

7. The method according to claim 5, wherein the movement direction of the receiving device relative to the base body of the aircraft galley is determined on the basis of the order in which two light barriers of a light-barrier system are broken, which barriers are arranged one behind the other in relation to the movement direction of the receiving device relative to the base body of the aircraft galley.

8. The method according to claim 5, wherein a position, determined by the data processing unit, of a receiving device in the base body of the aircraft galley is output in the form of a graphical representation.

9. A method for stockkeeping in an aircraft galley, the method comprising:
- detecting a movement direction of a receiving device relative to the base body of the aircraft galley, wherein the movement direction of the receiving device relative to the base body of the aircraft galley is determined on the basis of the order in which two light barriers of a light-barrier system are broken, which barriers are arranged one behind the other in relation to the movement direction of the receiving device relative to the base body of the aircraft galley,
- emitting identification signals which are each characteristic of the content of receiving devices provided for reception in a base body of the aircraft galley,
- reading in the identification signals and transmitting the identification signals to a data processing unit,
- determining the inventory of the aircraft galley on the basis of the identification signals transmitted to the data processing unit,
- determining the position of the receiving device in the base body of the aircraft galley with the data processing unit, on the basis of the identification signals transmitted to the data processing unit, and on the basis of the movement direction of the receiving device relative to the base body of the aircraft galley, wherein the data processing unit employs a last-in-first-out logic to determine the position of the receiving device in the base body of the aircraft galley, and
- outputting the inventory of the aircraft galley determined by the data processing unit.

\* \* \* \* \*